(12) United States Patent
Winzer

(10) Patent No.: US 8,817,895 B2
(45) Date of Patent: Aug. 26, 2014

(54) COMMUNICATION VIA A MULTIMODE CONSTELLATION

(71) Applicant: Alcatel Lucent, Paris (FR)

(72) Inventor: Peter J. Winzer, Aberdeen, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

(21) Appl. No.: 13/887,594

(22) Filed: May 6, 2013

(65) Prior Publication Data

US 2013/0243426 A1 Sep. 19, 2013

Related U.S. Application Data

(62) Division of application No. 12/751,442, filed on Mar. 31, 2010, now Pat. No. 8,457,216.

(60) Provisional application No. 61/289,862, filed on Dec. 23, 2009.

(51) Int. Cl.
*H04L 27/00* (2006.01)

(52) U.S. Cl.
USPC ............ 375/259; 375/316; 375/324; 375/340

(58) Field of Classification Search
USPC .................................. 375/259, 316, 324, 340
See application file for complete search history.

(56) References Cited

U.S. PATENT DOCUMENTS

| | | | |
|---|---|---|---|
| 6,160,855 A | 12/2000 | Nakamura et al. | |
| 7,787,525 B1 * | 8/2010 | Clark et al. | 375/218 |
| 8,155,534 B2 | 4/2012 | Winzer | |
| 8,295,714 B2 | 10/2012 | Winzer | |
| 8,320,769 B2 | 11/2012 | Essiambre et al. | |
| 8,355,638 B2 | 1/2013 | Essiambre et al. | |
| 8,467,858 B2 * | 6/2013 | Vertikov et al. | 600/478 |
| 8,526,831 B2 | 9/2013 | Winzer | |
| 8,571,423 B2 | 10/2013 | Winzer | |
| 2004/0100405 A1 * | 5/2004 | Mohamadi | 343/700 MS |
| 2005/0180312 A1 | 8/2005 | Walton et al. | |
| 2005/0260947 A1 | 11/2005 | Karabinis et al. | |
| 2006/0278240 A1 | 12/2006 | Spillman, Jr. et al. | |
| 2007/0183715 A1 | 8/2007 | Murshid et al. | |
| 2008/0008264 A1 | 1/2008 | Zheng | |
| 2008/0151972 A1 | 6/2008 | Hansen et al. | |
| 2010/0150559 A1 | 6/2010 | Essiambre et al. | |
| 2010/0150577 A1 | 6/2010 | Essiambre et al. | |
| 2010/0158521 A1 | 6/2010 | Doerr et al. | |

FOREIGN PATENT DOCUMENTS

WO WO 01/49001 A1 7/2001

OTHER PUBLICATIONS

Winzer, Peter J., "Modulation and multiplexing in optical communication systems", IEEE LEOS Newsletter, Feb. 2009, pp. 4-10.
PCT International Search Report, PCT/US2010/061702, International Filing Date Dec. 22, 2010, Date of Mailing Jul. 1, 2011.

* cited by examiner

*Primary Examiner* — Ted Wang
(74) *Attorney, Agent, or Firm* — John F. McCabe

(57) ABSTRACT

An apparatus includes a digital data transmitter capable of sequentially exciting different sets of one or more propagation modes in a physical communication channel. Each set of one or more propagation modes has a different spatial distribution of transmitted energy in the channel. The digital data transmitter is configured to sequentially change the excited set of one or more propagation modes to transmit a different value of data to the communication channel.

5 Claims, 3 Drawing Sheets

COMMUNICATION VIA A MULTIMODE CONSTELLATION

This is a divisional of application Ser. No. 12/751,442, filed Mar. 31, 2010.

This application claims the benefit of U.S. Provisional Application No. 61/289,862 filed on Dec. 23, 2009.

BACKGROUND

1. Technical Field

The inventions relate to optical communication systems.

2. Discussion of the Related Art

This section introduces aspects that may be helpful to facilitating a better understanding of the inventions. Accordingly, the statements of this section are to be read in this light and are not to be understood as admissions about what is in the prior art or what is not in the prior art.

Some current communications systems propose the use of pulse position modulation (PPM) to achieve high sensitivity at a receiver. In PPM, a signal is transmitted during a single time slot of the M time slots within each symbol period. In each symbol period, the receiver examines each of the M time slots to identify the time slot in which the signal wits transmitted. Unfortunately, increasing the number of time slots per symbol interval causes the PPM pulses to become temporally narrow and to have correspondingly larger bandwidths. For that reason, PPM may not provide a high spectral efficiency.

BRIEF SUMMARY

An embodiment of an apparatus includes a digital data transmitter capable of sequentially exciting different sets of one or multiple propagation modes in a physical communication channel. Each set of one or multiple modes produces a different spatial distribution of transmitted energy in the physical communication channel. The digital data transmitter is configured to sequentially change the selected set of one or multiple excited propagation modes to transmit a different value of data to the communication channel.

In some embodiments of the apparatus, the digital data transmitter is a wireless transmitter having an array of antennas, and the transmitter is able to power the antennas differently to sequentially excite different ones of the propagation modes.

In some embodiments of the apparatus, the digital data transmitter is an optical transmitter having an optical modulator that is capable of sequentially exciting different optical propagation modes in a multi-mode optical waveguide.

In some embodiments of the apparatus, each set is a selected propagation mode, and the selected propagation modes of different ones of the sets are substantially orthogonal.

In some embodiments of the apparatus, the digital data transmitter is configured to excite a different one of the propagation modes to transmit a different value of digital data.

In some embodiments, the apparatus further includes a digital data receiver connected to receive signals transmitted by the digital data transmitter and configured to identify the sets of one or mom propagation modes excited by the digital data transmitter in corresponding temporal symbol slots. The digital data receiver may be a wireless receiver having an array of antennas, and the receiver may be configured to measure intensities received by different ones of the antennas and to use said measured intensities to identify the sets of one or more propagation modes excited in the corresponding temporal symbol slots. Alternatively, the digital data receiver may be an optical receiver capable of identifying the sets of one or more propagation modes excited by the transmitter in a sequence of corresponding temporal symbol slots.

In another embodiment, an apparatus includes a digital data receiver configured to measure a spatial energy distribution of received electromagnetic signals in each temporal symbol period of a sequence. The receiver is configured to identify a set of one or more propagation modes excited in a physical communication channel by a transmitter from the spatial energy distribution measured for the corresponding temporal symbol period.

In some embodiments of the apparatus, the digital data receiver includes an array of antennas. The antennas are configured for measuring the spatial energy distributions.

In some embodiments of the apparatus, the digital data receiver includes an optical detector capable of determining a propagation mode of an optical signal. The optical detector may be configured to measure spatial intensities of optical signals received from free space. In other such embodiments, the optical detector may be configured to measure lateral spatial intensities of optical signals received from a multi-mode optical waveguide, e.g., an optical fiber.

In another embodiment, a method is provided for point-to-point transmission of digital data. The method includes receiving a sequence of digital data in a digital data transmitter. For each received digital datum of the sequence, the method includes selecting a corresponding set of one or more propagation modes in the digital data transmitter such that different ones of the sets are selected for different values of the digital data. With the digital data transmitter, the method includes successively exciting each selected set of one or more propagation modes in the physical communication channel during a corresponding temporal symbol period. Each of the sets produces a different spatial energy pattern at a detector of a digital data receiver.

In some embodiments of the method, each set is a different set of one or more optical transmission modes.

In some embodiments of the method, each set includes a propagation mode that is orthogonal to a propagation mode of the remaining one or more sets.

In some embodiments of the method, the selecting involves selecting a signal point from a constellation of fixed size, each et being one of the signal points of the constellation.

In another embodiment, a method is provided for point-to-point reception of data the method includes at each temporal symbol slot of a sequence thereof, measuring a spatial energy distribution of an electromagnetic signal received at as digital data receiver from a physical communication channel. The method includes from each measured spatial energy distribution, selecting a set of one or more propagation modes that likely excited the received spatial energy distribution in the corresponding temporal symbol slot.

In some embodiments of the method, each act of measuring includes measuring a spatial energy intensity distribution received from a free space communication channel.

In some embodiments of the method, each act of measuring includes measuring a lateral spatial energy intensity distribution received from a multi-mode optical waveguide, e.g., an optical fiber.

BRIEF DESCRIPTION OF THE DRAWINGS

In the Figures and text, like reference symbols indicate elements with similar or the same function and/or structure.

In the Figures, relative dimensions of some features may be exaggerated to more clearly illustrate the features and/or their relation to other elements therein.

Herein, various embodiments are described more hilly by the Figures and the Detailed Description of Illustrative Embodiments. Nevertheless, the inventions may be embodied in various forms and are not limited to the embodiments described in the Figures and the Detailed Description of Illustrative Embodiments.

DETAILED DESCRIPTION OF ILLUSTRATIVE EMBODIMENTS

Different propagation modes have been proposed as carriers for concurrently transmitting different data streams. In contrast, in embodiments described herein, a digital modulation symbol is formed by simultaneously exciting a set of one or more propagation modes within each temporal symbol interval. The identity of the set of transmitted propagation mode(s) fixes the value of the symbol being transmitted in the corresponding temporal symbol interval.

Figure 1:
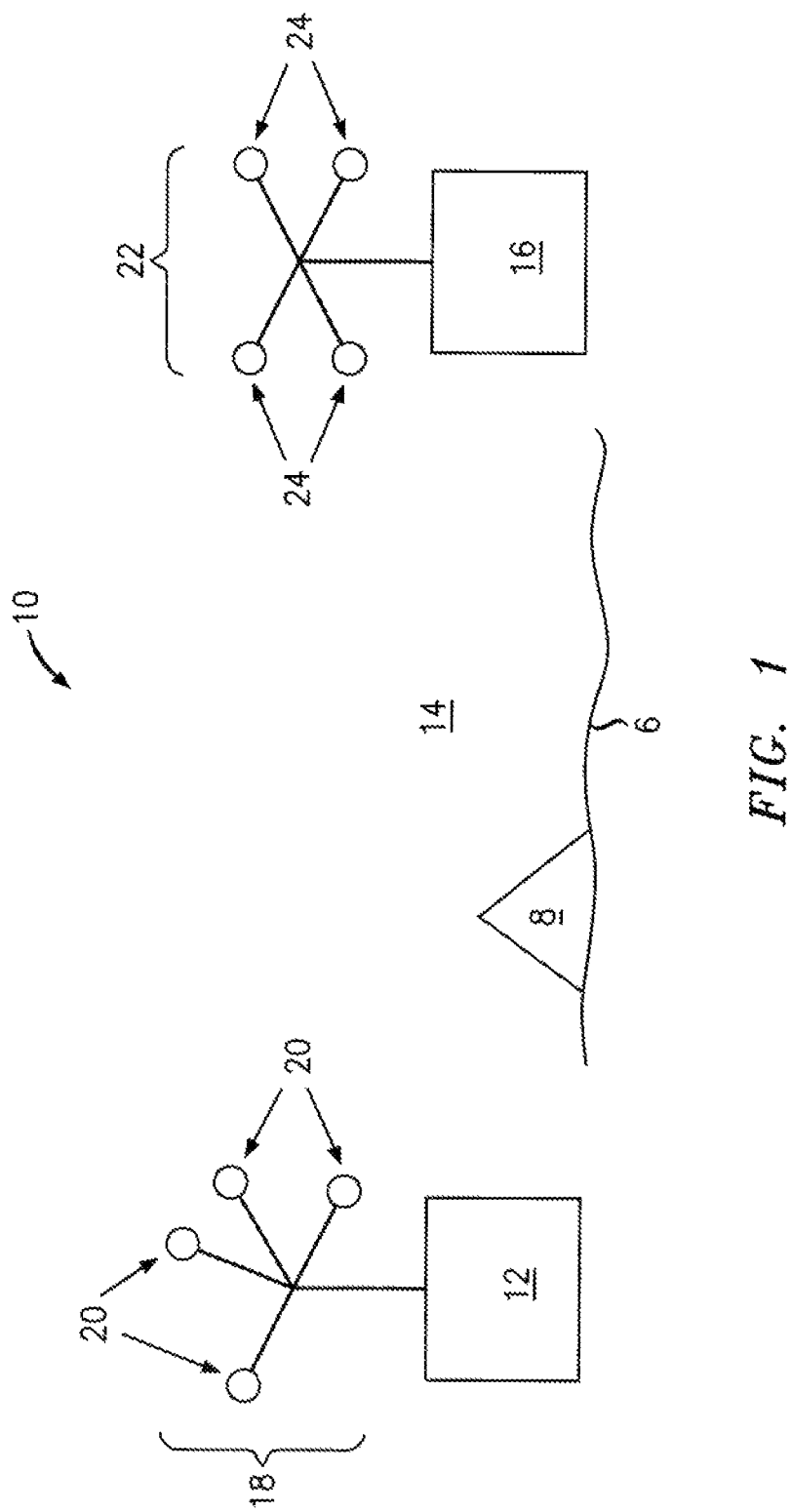
FIG. 1 illustrates an embodiment of a point-to-point wireless communication system.

FIG. 1 illustrates a point-to-point wireless communication system 10 that includes a wireless transmitter 12 for digital data, a wireless communication channel 14, and a wireless receiver 16 for digital data.

The wireless transmitter 12 controls a spatial array 18 of transmission Antennas 20 or another spatially distributed structure capable of individually exciting different sets of one or more spatial propagation modes (not shown) in the wireless communication channel 14. The spatial array 18 may include, e.g., a regular one-dimensional (1D) or a regular two-dimensional (2D) of transmission antennas 20. The spatial array 18 is controllable to sequentially transmit or convert different data signals into different ones of the sets of one or more propagation modes. Here, each such set has a different spatial distribution of energy therein, e.g., each such set may be a different mode of a collection of substantially orthogonal or orthogonal propagation modes. That is, the transmitter 12 causes the transmission antennas 20 to transmit in a mutually coherent manner to excite outgoing electro-magnetic beams with different spatial patterns of energy, e.g., at a radio or optical frequency. The wireless transmitter 12 can excite a sequence of sets of one or more outgoing propagation modes with different spatially intensity distributions in the different temporal symbol slots.

The wireless communication channel 14 includes a free-space region between the wireless transmitter 12 and wireless receiver 14. The free space region may be near the surface 6 of the earth and/or may include part of upper atmospheric layer(s) of the earth, which can scatter or reflect wireless communications. The free-space region may be near scattering and/or reflecting bodies 8 that modify the energy distributions of the electromagnetic propagation modes excited by the wireless transmitter 12. The free-space region may also include a portion outside the atmosphere, i.e., in space.

The wireless receiver 16 has a spatial array 22 of receiver antennas 24 or another spatially distributed structure that is configured for use to identify and distinguish the different sets of one or more spatial propagation modes excited by the wireless receiver 16. The spatial array 22 may also be e.g., a regular 1D or a regular 2D of the receiving antennas 24. The spatial array 22 is configured to detect wireless propagating electromagnetic signals excited by the wireless transmitter 12 and to accumulate spatial data on the received spatial intensity patterns of said detected signals. The wireless receiver 16 is able to use said data to identify the individual sets of one or more spatial propagation modes that were excited by the wireless transmitter 12 in the different temporal symbol slots. That is, the receiver 16 uses data for the spatial distributions of electromagnetic wave intensities received at the individual receiver antennas 24 to identify the particular set of one or more propagation modes that was excited by the wireless transmitter 12 in a corresponding symbol slot.

Figure 3C:
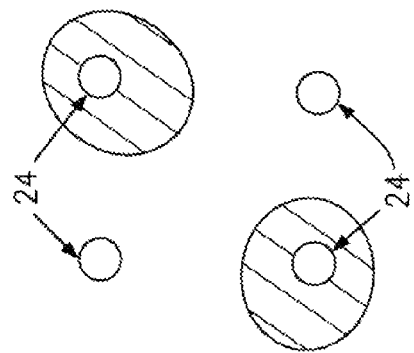
FIGS. 3A-3C schematically illustrate energy distributions of waves of different transmitted propagating modes at a spatial detection array of a receiver, e.g., the receiver of FIG. 1 or 2.
Figure 3B:
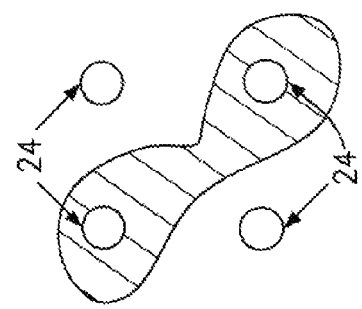
Figure 3A:
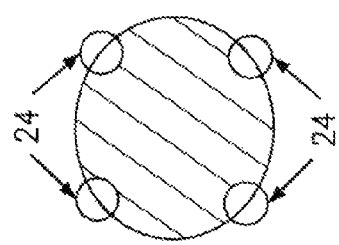

FIGS. 3A, 3B, and 3C schematically illustrate possible spatial patterns for high intensity regions, i.e., cross-hatched regions, which respective three different Propagation modes A, B, and C may make at one spatial array 20 of receiver antennas 24 of the wireless receiver 16. Based on FIGS. 3A-3C, the wireless receiver 16 may identify the electromagnetic propagation mode excited by the wireless transmitter 12 as being the propagation mode A if each receiver antenna 24 detects a signal intensity in a symbol slot. Also, the wireless receiver 16 may identify the excited electromagnetic propagation mode as being the propagation mode B if the upper-left and lower-right receiver antennas 24 detect a high signal intensity in a symbol slot, and the other receiver antennas 24 do not detect a high signal intensity in the same symbol slot. Finally, the wireless receiver 16 may identify the excited electromagnetic propagation mode as being the propagation mode C if the upper-right and lower-left receiver antennas 24 detect a high signal intensity in a symbol slot, and the other receiver antennas 24 do not detect a high signal intensity in the same symbol slot.

Of course, other embodiments may use electromagnetic propagation modes or sets thereof with different intensity distributions and different forms for the spatial array 22 at the wireless receiver 16. In the various embodiments, the spatial distributions of the intensity and/or polarization substantially differ between the different sets of one or more propagating modes excited by the wireless transmitter 12 to transmit data.

Figure 2:
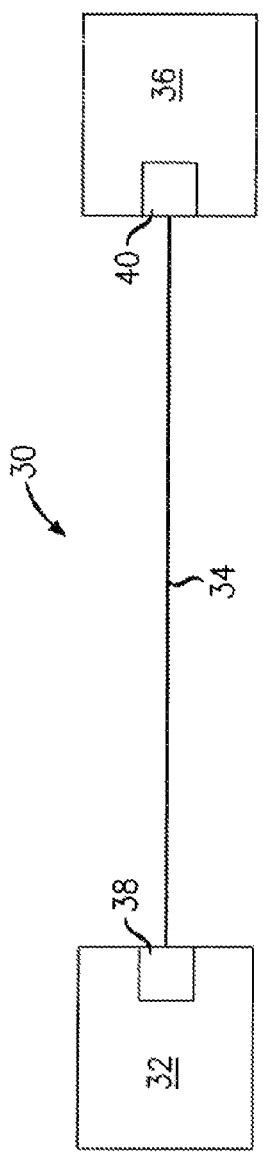
FIG. 2 illustrates an embodiment of a point-to-point optical communication System.

FIG. 2 illustrates a point-to-point optical communication system 30 that includes an optical transmitter 32 for digital data, a multi-mode optical transmission waveguide 34, e.g., a multi-mode optical transmission fiber, and an optical receiver 36 for digital data. The optical transmitter 34 includes an optical modulator 38 that is able to sequentially excite different sets alone or more optical propagation modes in the multi-mode optical transmission waveguide 34, i.e., in a sequence of corresponding temporal symbol slots. That is, the optical transmitter 34 includes an optical modulator that is able to excite optical propagation modes having different lateral spatial intensity profiles in the multi-mode optical transmission fiber 34, e.g., substantially orthogonal propagation modes. The optical receiver 36 includes an optical detector 40 that is configured to make a spatial measurement of an intensity, a phase, and/or a polarization distribution for each received set of one or more optical propagation modes. From each such spatial measurement of the optical detector 40, the optical receiver 36 is able to distinguish and identify the specific spatial propagation mode or set thereof that was probably excited to transmit digital data by the optical transmitter 32 in the corresponding temporal symbol slot.

Examples optical modulators and optical detectors that are able to excite and identify optical propagation modes or sets thereof having different lateral spatial intensity profiles and/or polarizations in multi-mode optical transmission fibers may be described in one or both of U.S. patent application Ser. No. 12/492,399, which was filed on Jun. 26, 2009 by Rene-Jean Essiambre and Peter J. Winter, and U.S. patent application Ser. No. 12/492,391, which was filed on Jun. 26, 2009 by Rene-Jean Essiambre, Roland Ryf, and Peter J. Winzer. These two U.S. patent applications are incorporated by reference herein in their entirety.

The wireless and optical communications systems 10, 30 of FIGS. 1 and 2 temporally multiplex the sets of one or more prorogation mode to communicate a digital data stream via the physical communication channel. For example, these communication systems 10, 30 may transmit energy to substantially a single propagation mode in each temporal symbol slot and vary the propagation mode in successive temporal symbol slots to transmit a stream of varying data symbols via the physical communication channel.

Figure 4:
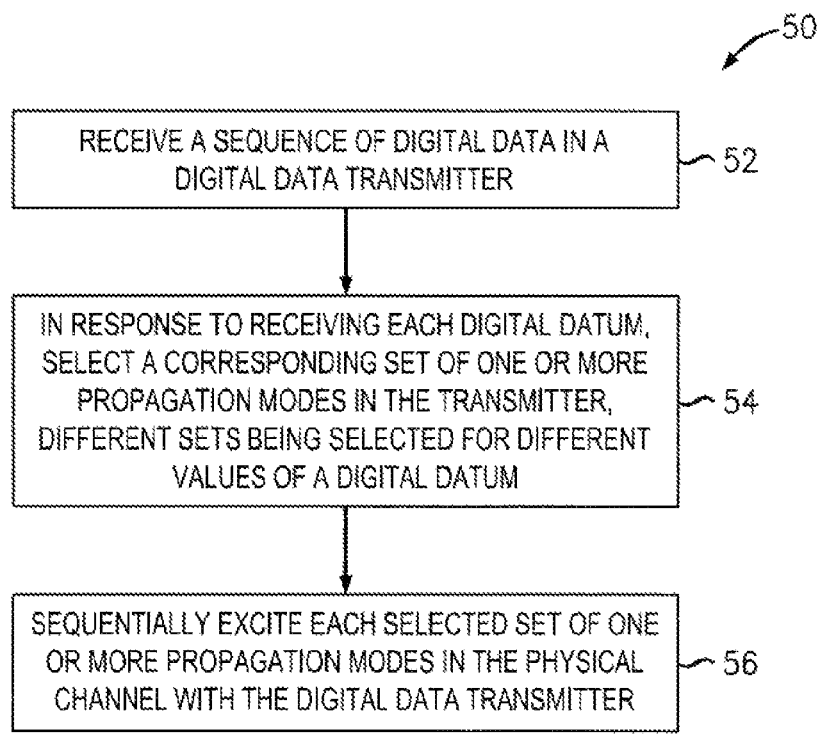
FIG. 4 is a flow chart illustrating a point-to-point method of transmitting data, e.g., using the wireless or optical transmitter of FIGS. 1 and 2.

FIG. 4 is a flow chart illustrating a point-to-point method 50 of transmitting data, e.g., using the wireless or optical transmitters 12, 32 of FIGS. 1 and 2.

The method 50 includes receiving a sequence of digital data in a digital data transmitter (step 52).

In response to receiving each digital datum oldie sequence, the method 50 includes selecting a corresponding set of one or more propagation modes for that digital datum in the transmitter (step 54). Different one of the sets of One or more propagation modes are selected for different values of the received digital datum. That is, the digital information in the sequence is converted by the transmitter to a corresponding sequence of the sets, wherein each set has one or more propagation modes therein.

Each of the sets of one or more propagation modes will propagate energy from the digital data transmitter to a digital data receiver via a physical communication channel when excited. The different sets of one or more propagation modes deposit different spatial energy distributions, e.g., at the digital data receiver. For example, each set may include only a single propagation mode that is orthogonal to or substantially orthogonal to the propagation mode(s) of the other set(s). Typically, exciting one of the sets of one or more propagation modes at the digital data transmitter will cause, at most, excitation(s) of the other set(s) of one or more propagation modes that are of small enough intensity for the digital data receiver to be able to identity the specific excited set of one or more propagation modes from a measurement of a received spatial energy distribution thereat.

The selection of a specific set of one or more propagation modes involves selecting points from a signal constellation of fixed size. In particular, each point of the signal constellation is a different one of the sets of one or more propagation modes that can transmit energy from the digital data transmitter to the digital data receiver via the physical communication channel. For example, each point may be a different orthogonal propagation mode so that each value of a digital datum is encoded by the identity of a corresponding propagation mode. Thus, in one embodiment, to encode N-bits of data via the selecting step 54, the data transmitter uses a signal constellation of $2^N$ or more different propagation modes, e.g., $2^N$ orthogonal propagation modes with different spatial energy distributions. In another embodiment, the transmitter uses K propagation modes per information symbol thereby encoding $\log_2(_K^N)$ bits per information symbol.

The method 50 includes sequentially exciting, each selected set of one or more propagation modes in the physical communication channel with the digital data transmitter (step 56). Each successively selected one of the sets of one or more propagation modes is excited in a corresponding temporal symbol slot for the digital data being transmitted. Thus, the selected sets are successively excited to produce a temporal stream of sets of one or more propagation modes directed to the digital data receiver.

Figure 5:
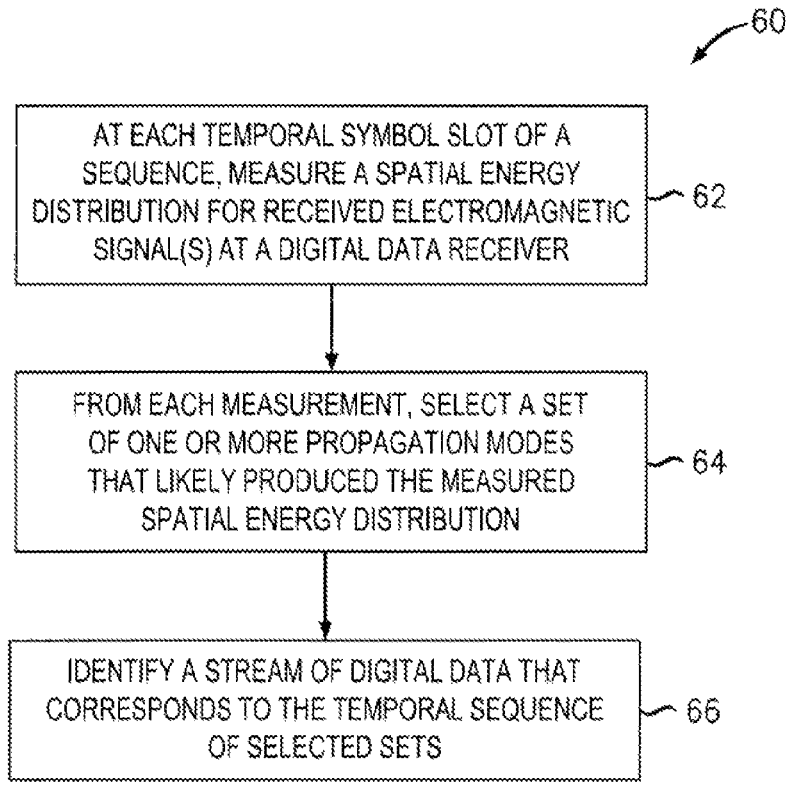
FIG. 5 is a flow chart illustrating a point-to-point method of receiving data. e.g., using the wireless or optical receiver of FIGS. 1 and 2.

FIG. 5 is a flow chart illustrating a point-to-point method 60 of receiving data using the wireless or optical receivers 16, 36 of FIGS. 1 and 2.

At each temporal symbol slot of a sequence thereof, the method 60 includes measuring a spatial energy distribution of a received electromagnetic signal, e.g., a radio or optical signal that is received at the digital data receiver from a physical communication channel (step 62).

From each of the measurements of a spatial energy distribution, the method 60 includes selecting a set of one or more propagation modes that were likely excited in the physical communication channel by a digital data transmitter to produce the measured spatial energy distribution in the corresponding temporal symbol slot (step 64). In particular, each selection involves picking a signal point of a fixed constellation, wherein each of the signal points of the constellation corresponds to a different one of the sets.

The method 60 also includes identifying a stream of digital data that corresponds to the temporal sequence of sets that was selected at the step 62 (step 66). That is, the different sets of one or more propagation modes correspond to different transmitted values of digital data. The transmitted digital information of the stream of digital data that was likely communicated by the digital data transmitter is contained in the temporal sequence of the selected sets.

As already stated, for the method 50, in the method 60, each set of one or more propagation modes propagates energy from the digital data transmitter to a digital data receiver via a physical communication channel when the mode(s) of the set is (are concurrently) excited. The different sets of one or more propagation modes produce different spatial energy distributions, e.g., at the digital data receiver. For example, each set may include a single propagation mode that is orthogonal or substantially orthogonal to the propagation mode(s) of the other set(s). One of the sets of one or more propagation modes causes, at most, excitation(s) of the other set(s) that are of small enough intensity for the digital data receiver to still be able to distinguish and identify the specifically excited set from the other sets via the measured spatial energy distribution.

From the disclosure, drawings, and claims, other embodiments of the invention will be apparent to those skilled in the art.

What is claimed is:

1. An apparatus, comprising:
   a digital data receiver being configured to measure a spatial energy distribution of one or more received electromagnetic signals in each temporal symbol period of a sequence and being configured to identify a set of one or more propagation modes excited in a physical communication channel by a transmitter from the spatial energy distribution measured for the corresponding temporal symbol period; and
   wherein the digital data receiver is configured to identify a stream of transmitted digital data corresponding to the sequence of identified sets, different ones of the identified sets corresponding to different values of the transmitted digital data.

2. The apparatus of claim 1, wherein the digital data receiver includes an array of antennas, the antennas for measuring the spatial energy distributions.

3. The apparatus of claim 1, wherein the digital data receiver includes an optical detector capable of identifying a propagation mode of an optical signal.

4. The apparatus of claim 3, wherein the optical detector is configured to measure spatial intensities of optical signals received from free space.

5. The apparatus of claim 3, wherein the optical detector is configured to measure spatial intensities of optical signals received from a multi-mode optical waveguide.

* * * * *